T. W. Porter.
Express-Wagon.
N° 75972.  Patented Mar. 24, 1868.
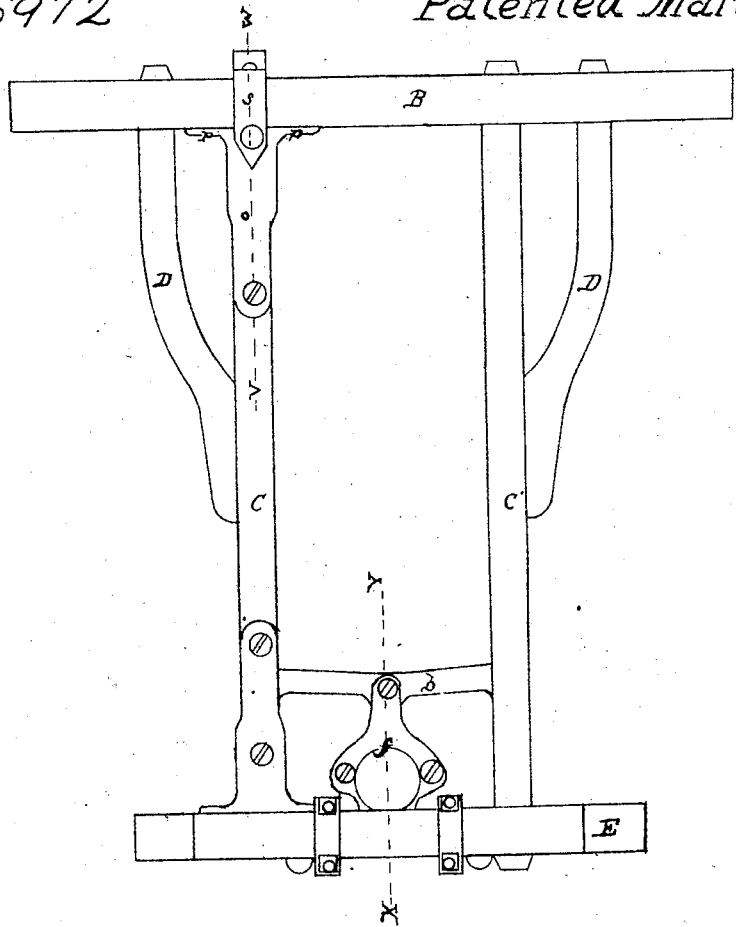
Fig. 2
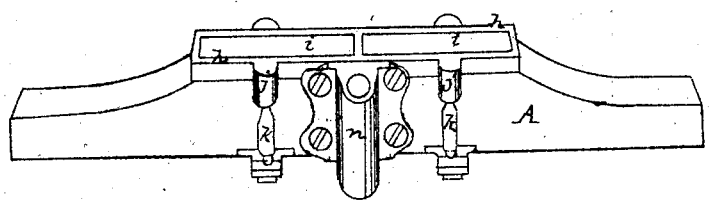
Fig. 3
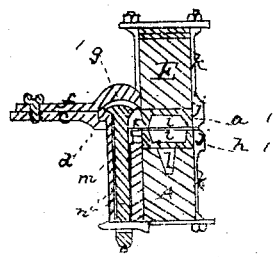
Witnesses
H. T. Whitman
H. K. Porter
Inventor
T. W. Porter T. W. Porter.
Express-Wagon.
N° 75972. Patented Mar. 24, 1868

Witnesses
C. T. Whitman
H. K. Porter

Inventor
T. W. Porter

United States Patent Office.

T. W. PORTER, OF BOSTON, MASSACHUSETTS, ASSIGNOR TO HIMSELF AND CHARLES L. MARSTON.

Letters Patent No. 75,972, dated March 24, 1868.

IMPROVEMENT IN EXPRESS-WAGON.

*The Schedule referred to in these Letters Patent and making part of the same.*

TO ALL WHOM IT MAY CONCERN:

Be it known that I, T. W. PORTER, of Boston, in the county of Suffolk, and State of Massachusetts, have invented a new and useful Improvement in Express-Wagons; and I do hereby declare that the following is a full, clear, and exact description of the construction and operation of the same, reference being had to the accompanying drawings, making a part of this specification, in which—

Figure 1 is a top or plan view of the under-work.

Figure 2 is a perspective view of the front axle.

Figure 3 is a vertical transverse section, taken on line X Y.

Similar letters of reference indicate corresponding parts in the several figures.

Figure 6:
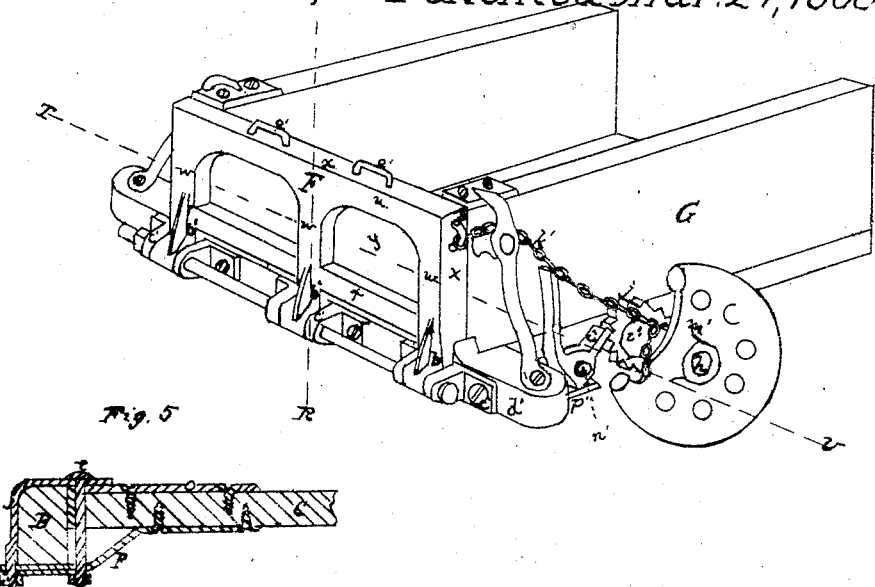
Figure 6 is a perspective view of the tail-board and adjusting-device.
Figure 5:
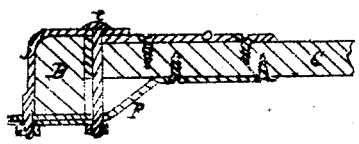
Figure 5 is a vertical section, taken on line V W.

The nature of my invention consists in an improved coupling for the head-block and forward axle, obviating holes through the axle and stock, for either the king-bolt or bolts attaching the rocker and axle-plates, and in forming these plates cheaply and indestructible; also in an improved method of attaching the perches to the axle and head-block, and in an improved tail-board, and device for adjusting and securing the same.

In the drawings, A represents the forward axle, B the hind axle, and C and C' the perches; D D the perch-stays, and E the head-block. $a$ is the rocker-plate, which is formed with straps extending along the under side of the perches, and are united by the bar $b$, while a central tail or bar $c$ extends from the centre of the plate to bar $b$. In the tail $c$, just in rear of the head-block, is a recess, in which the circular disk or die $d$ fits, as shown. Upon the lower side of disk $d$ is a flange, which extends through a hole in the tail $c$, as shown. Through a central hole in disk $d$ the king-bolt $e$ passes. A packing of rubber, $g$, is placed between the king-bolt and the cap $f$, to obviate rattling. The cap $f$, which corresponds in outline to tail $c$, is secured thereto by screws, as shown. The die $d$ may be formed with a slight projection to fit to a corresponding recess in the tail $c$, to prevent the die from being revolved by the rotation of the king-bolt, and it may be formed of hard metal, to prevent its being rapidly worn by the motion of the bolt. $h$ is the axle-plate, with recesses or panels in its face, in which are embedded, and secured by rivets or otherwise, bars of white iron $i\ i$. Upon the edges of the rocker and axle-plates are formed lugs $j\ j$, into which are screwed the straps K K, which pass through yokes, as shown, and are secured by screw-nuts, and thereby firmly secure the plates to their places. Upon the under side of the rocker-plate are formed two pins, shown at $l$; these pins being inserted in the stock of the axle, prevent all end play of the plate. And upon the back edge of the axle-plate, a short pin, $m$, is formed; this pin passes through the inside shell of the tubed plate $n$, attached to the axle, and in which the king-bolt is inserted; this pin $m$ prevents lateral play of the plate $n$. The rocker and axle-plates I construct of malleable iron, as well as the tube-plate $n$, cap $f$, and disk $d$, by which means they receive their peculiar shape, and the inlaid bars $i\ i$, being white iron, are less expensive than steel, yet more durable for this purpose.

Figure 4:
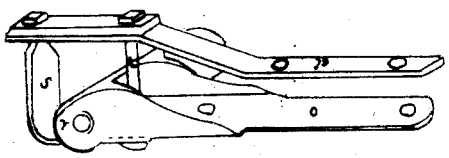
Figure 4 is an under side perspective view of the perch and axle-coupling.

The perch C', as also the stays D D, are attached to the axle and head-block by the usual means of mortises and tenons, as shown, and in full size are strengthened by side straps, of iron. The perch C is secured to the axle by means of the coupling $o$, shown plainly in fig. 4, the end of the perch being inserted in the recess in the coupling, and is secured thereto, in practice, by bolts passing through the coupling, perch, and under strap P, while it is securely attached to the axle by bolts passing through the ears $r\ r$, formed upon the coupling, and by the strap $s$, which, at its upper end, is held by bolt $t$, while its lower end, as also bolt $t$, passes through strap P, thus forming, in effect, a clip and yoke upon the axle and stock, as well as securing the perch thereto. To secure the perch to the rocker, the same kind of coupling is used, which is bolted by the ears to the head-block, and the perch is secured thereto by bolts passing through the coupling, perch, and strap, formed upon the rocker-plate, as before mentioned. By the use of the coupling the cost is lessened and the strength is increased.

The improvement in tail-board, mentioned, consists in a hollow or cellular framework, F, which consists of an upper bar, $v$, lower bar $v'$, and three transverse bars $w\ w\ w$, all making an entire casting. Any desired outline of form may be employed instead of that here shown.

Figure 7:
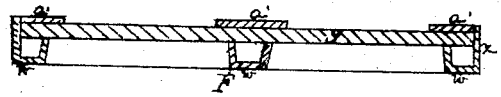
Figure 7 is a horizontal section, taken on line T U.
Figure 8:
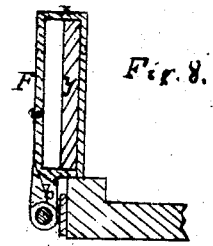
Figure 8 is a vertical section, taken on line R S.

To give strength and lightness to this frame, it is formed of thin facings or angles of iron, as is shown in figs. 7 and 8. And around the outer edge a wider flange, of iron, marked $x$, is formed, which encloses and protects the panel $y$; this panel may be of sheet iron or wood, or both. Three plates of iron, $a'\ a'\ a'$, are here shown as being placed across the panel, to protect it. Upon the lower edge of frame F are formed three strap-eyes $b'\ b'\ b'$, which fit into the hinges $c'\ c'\ c'$, upon sill $d'$, and constitute the tail-board hinges. The strap-eyes $b'$ are represented as being strengthened by a slightly-projecting flange in their centre; and these strap-eyes may be formed cellular, upon either side, or they may be made of wrought iron, and secured to the frame. $e'\ e'$ are brackets, formed upon the frame F, and serve to receive the hooks of the loading-skids. $f'$ is an eye, also formed upon the frame F, one each side, to which chain $k'$ is attached, as shown.

To secure the tail-board in any desired position, I employ the devices hereinafter described; premising that those upon the side here shown are exactly similar to those used upon the other side of the body G. $h'$ is a shaft, passing across, under the body, and secured by boxes attached to the sills. Upon this shaft are secured two small drums, $i'$, formed with a ratchet at the edge, as shown at $j'$, and chains $k'$, passing from eyes $f'$, upon the tail-board, over the roller $l'$, to the drums $i'$, form the connection between the tail-board and the drums, and serve as the means of securing the board at any desired point. The drums $i'$ are actuated by means of the hand-wheel $m'$, also secured upon shaft $h'$, and by this means the chains are let out or rolled upon the drums.

To secure the tail-board in place, another shaft, $n'$, passes under the body, and upon this shaft are secured two lever-pawls or catches, $o'$, which catch into the ratchets $j'$ and prevent their revolving when acted on by the chains. $P'$ is a spring, secured to sill $d'$, and which bears against the point formed on catch $o'$, and holds the same when thrown into or out of the ratchet. A hand-wheel may be placed upon either or both ends of the shaft $h$, as convenience may require.

What I claim as new, and desire to secure by Letters Patent, is—

1. The rocker and axle-plates $a$ and $h$, formed of malleable and white iron, substantially in manner as described and shown.
2. The removable disk or die $d$, in combination with the rocker-plate and king-bolt, substantially as and for the purposes specified.
3. The combination of packing $g$, cap $f$, and king-bolt $e$, substantially as described and shown.
4. The lugs $j\ j$, formed upon the axle and rocker-plates, by which, in combination with wrought-iron straps $k\ k$, to secure the plates to the axle and rocker.
5. The tube-plate $n$, substantially as and for the purposes specified.
6. The pivots $l\ l$, or their equivalents, formed upon the axle-plate, for the purposes specified.
7. The pin $m$, or its equivalent, formed upon the axle-plate, for the purposes specified.
8. The coupling $o$, substantially as described and shown.
9. The combination of coupling $o$, strap P, bolt $t$, and strap $s$, substantially as and for the purposes specified.
10. The metallic corrugated or cellular tail-board frame F, substantially as described and shown.
11. The strap-eyes $b\ b\ b$, formed upon the frame F, substantially in manner as described and shown.
12. The chain-eyes $f$, formed upon the frame F, substantially in manner as and for the purposes specified.
13. The skid-brackets $e$, formed upon the frame F, substantially in manner as described and shown.
14. The tail-board adjusting-device, consisting of chains $k'$, ratchet-drums $i'$, pawls $o'$, and the hand-wheel $m'$, or its equivalent, all arranged to operate in manner substantially as described and shown.

T. W. PORTER.

Witnesses:
H. K. PORTER,
J. REED.